United States Patent
Wang et al.

(10) Patent No.: US 8,132,158 B2
(45) Date of Patent: Mar. 6, 2012

(54) MECHANISM FOR SOFTWARE TRANSACTIONAL MEMORY COMMIT/ABORT IN UNMANAGED RUNTIME ENVIRONMENT

(76) Inventors: Cheng Wang, Santa Clara, CA (US); Youfeng Wu, Palo Alto, CA (US); Bratin Saha, San Jose, CA (US); Ali-Reza Adl-Tabatabai, Santa Clara, CA (US)

( * ) Notice: Subject to any disclaimer, the term of this patent is extended or adjusted under 35 U.S.C. 154(b) by 1184 days.

(21) Appl. No.: 11/648,005

(22) Filed: Dec. 28, 2006

(65) Prior Publication Data

US 2008/0162885 A1    Jul. 3, 2008

(51) Int. Cl.
*G06F 9/44* (2006.01)
(52) U.S. Cl. .......................... 717/127; 717/131
(58) Field of Classification Search .................. 717/124, 717/126–129, 131–133
See application file for complete search history.

(56) References Cited

U.S. PATENT DOCUMENTS 6,526,499 B2    2/2003    Palanca
(Continued)

OTHER PUBLICATIONS

Ananian, C.S.; Asanovic, K.; Kuszmaul, B.C.; Leiserson, C.E.; Lie, S.; "Unbounded transactional memory", 11th International Symposium on High-Performance Computer Architecture, 2005. HPCA-11, Feb. 12-16, 2005 pp. 316-327.

Ravi Rajwar, Maurice Herlihy, and Konrad Lai. "Virtualizing Transactional Memory." In Proc. of the 32nd Annual Intl. Symp. On Computer Architecture, Jun. 2005.

Kevin E. Moore, Jayaram Bobba, Michelle J. Moravan, Mark D. Hill & David A. Wood, "LogTM: Log-based Transactional Memory," HPCA 2006.

(Continued)

*Primary Examiner* — Ted T Vo
(74) *Attorney, Agent, or Firm* — David P McAbee

(57) ABSTRACT

A method and apparatus for ensuring integrity of transaction exit functions is herein described. Dead local data in a transaction is prevented from overwriting local variables associated with a transaction exit function. In a write-buffering Software Transactional Memory (STM) system, a commit function is associated with a private stack to store local variables to ensure write-back of local dead data in a write-buffer does not corrupt the commit function. Similarly, in a roll-back STM, an abort function is associated with a private stack to store local variables to ensure the roll-back of a program stack with local dead data from a write log does not corrupt the abort function. Alternatively, one stack may be used for the transaction including a first function and an exit function. Here, local dead variables are detected and prevented from overwriting local variables of the exit function.

24 Claims, 7 Drawing Sheets

U.S. PATENT DOCUMENTS

| | | | |
|---|---|---|---|
| 7,502,897 | B2 | 3/2009 | Hertzberg |
| 7,536,517 | B2 * | 5/2009 | Harris .......................... 711/150 |
| 2006/0085588 | A1 | 4/2006 | Rajwar |
| 2006/0109979 | A1 | 5/2006 | Afzal |
| 2006/0161740 | A1 | 7/2006 | Kottapalli |
| 2007/0136289 | A1 | 6/2007 | Adl-Tabatabai |
| 2007/0143287 | A1 | 6/2007 | Adl-Tabatabai |
| 2007/0143755 | A1 | 6/2007 | Saha |
| 2007/0156780 | A1 | 7/2007 | Saha |
| 2007/0156994 | A1 | 7/2007 | Akkary |
| 2007/0162520 | A1 | 7/2007 | Petersen |
| 2007/0186056 | A1 | 8/2007 | Saha |
| 2007/0233970 | A1 | 10/2007 | Saha |
| 2007/0260608 | A1 | 11/2007 | Hertzberg |
| 2007/0300238 | A1 | 12/2007 | Kontothanassis |
| 2008/0005504 | A1 | 1/2008 | Barnes |
| 2008/0021934 | A1 | 1/2008 | Hudson |
| 2008/0065864 | A1 | 3/2008 | Akkary |

OTHER PUBLICATIONS

M. Herlihy, V. Luchango, M. Moir and W.N. Scherer, "Software Transactional Memory for Dynamic Sized Data Structures", PODC 2003.

T. Harris and S. Marlow, S.P. Jones, and M. Herlihy. Composable Memory Transactions. In Proceedings of the Tenth ACM Symposium on Principles and Practice of Parallel Programming, 2005.

V. J. Marathe, W. N. Scherer III, and M. L. Scott. Adaptive Software Transactional Memory. In Proceedings of the Nineteenth International Symposium on Distributed Computing, 2005.

Timothy Harris, MarkPlesko, Avraham Shinnar and David Tarditi, Optimizing Memory Transactions. In Proceeding of Conference on Programming Language Design and Implementation, 2006.

H. Berenson, P. Bernstein, J. Gray, J. Melton, E. O'Neil, and P. O'Neil. "A critique of ANSI SQL isolation levels". In Proceedings of SIGMOD, pp. 1-10, 1995.

"Implementing a High Performance Software Transactional Memory for a Multi-core Runtime" by Bratin Saha, Ali-Reza Adl-Tabatabai, Rick Hudson, Chi Cao Minh, and Ben Hertzberg, Proceedings of the eleventh ACM SIGPLAN symposium on Principles and practice of parallel programming, 2006.

"Language Support for Lightweight Transactions", by T.L. Harris and K. Fraser, Proceedings of the 2003 ACM SIGPLAN Conference on Object-Oriented Programming Systems.

Languages and Applications; and "Compiler and runtime support for efficient software transactional memory," by Ali-Reza Adl-Tabatabai, Brian Lewis, Vijay Menon, Brian Murphy, Bratin Saha, and Tatiana Shpeisman. Proceedings of the 2006 ACM SIGPLAN conference on Programming language design and implementation.

Fraser, Keir et al., "Concurrent Programming Without Locks", ACM Transactions on Computer Systems, vol. 25, No. 2, Article 5, May 2007, 61 pages.

Riegel, Torval et al., "Snapshot Isolation for Software Transactional Memory", In Proceedings of the First ACM SIGPLAN Workshop on Languages, Compilers, and Hardware Support for Transactional Computing (Transact Jun. 11, 2006), 10 pages.

Shavit, Nir et al., "Software Transactional Memory", In the ACM Symposium on the Principles of Distributed Computing, Jan. 1996, pp. 1-16.

* cited by examiner

MECHANISM FOR SOFTWARE TRANSACTIONAL MEMORY COMMIT/ABORT IN UNMANAGED RUNTIME ENVIRONMENT

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple threads present on individual integrated circuits. A processor or integrated circuit typically comprises a single processor die, where the processor die may include any number of cores or threads, which are often viewed from the perspective of software as logical processors. A core or thread is may also be referred to as a resource, such as a processing resource.

The ever increasing number of resources on integrated circuits enables more software threads to be executed simultaneously. However, the increase in the number of software threads that may be executed concurrently have created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hash table.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict.

During execution of a transaction a function call may be made. During execution of the function within the transaction address-taken local variables are buffered in a write buffer or logged in a write log. When returning from the function, certain local variables from the function become dead data. Upon exiting the transaction through an abort or commit, the transaction updates, which are either stored in a write log or write buffer, are written back to a program stack. However, the abort or commit function is potentially using data located in the program stack for local variables as well. Consequently, the updates of the program stack with the write logged/buffered data potentially corrupts local data elements for the abort or commit function.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware support for transactional execution, specific tracking/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific multi-core and multi-threaded processor architectures, interrupt generation/handling, cache organizations, and specific operational details of microprocessors, have not been described in detail in order to avoid unnecessarily obscuring the present invention.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. However, other representations of values in computer systems have been used. For example the decimal number 10 may also be as a binary value of 1010 and a hexadecimal letter A.

Moreover, states may be represented by values or portions of values. As an example, a locked state may be represented by a first value in a location, such as an odd number, while a version number, such as an even value, in the location represents an unlocked state. Here, a portion of the first and second value may be used to represent the states, such as two lower bits of the values, a sign bit associated with the values, or other portion of the values.

The method and apparatus described herein are for handling local dead data in a software transactional memory (STM) system. Specifically, handling local dead data in a software transactional memory (STM) system is primarily discussed in reference to multi-core processor computer systems. However, the methods and apparatus for handling local dead data in a software transactional memory (STM) system are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads, that utilize transactional memory.

Figure 1:
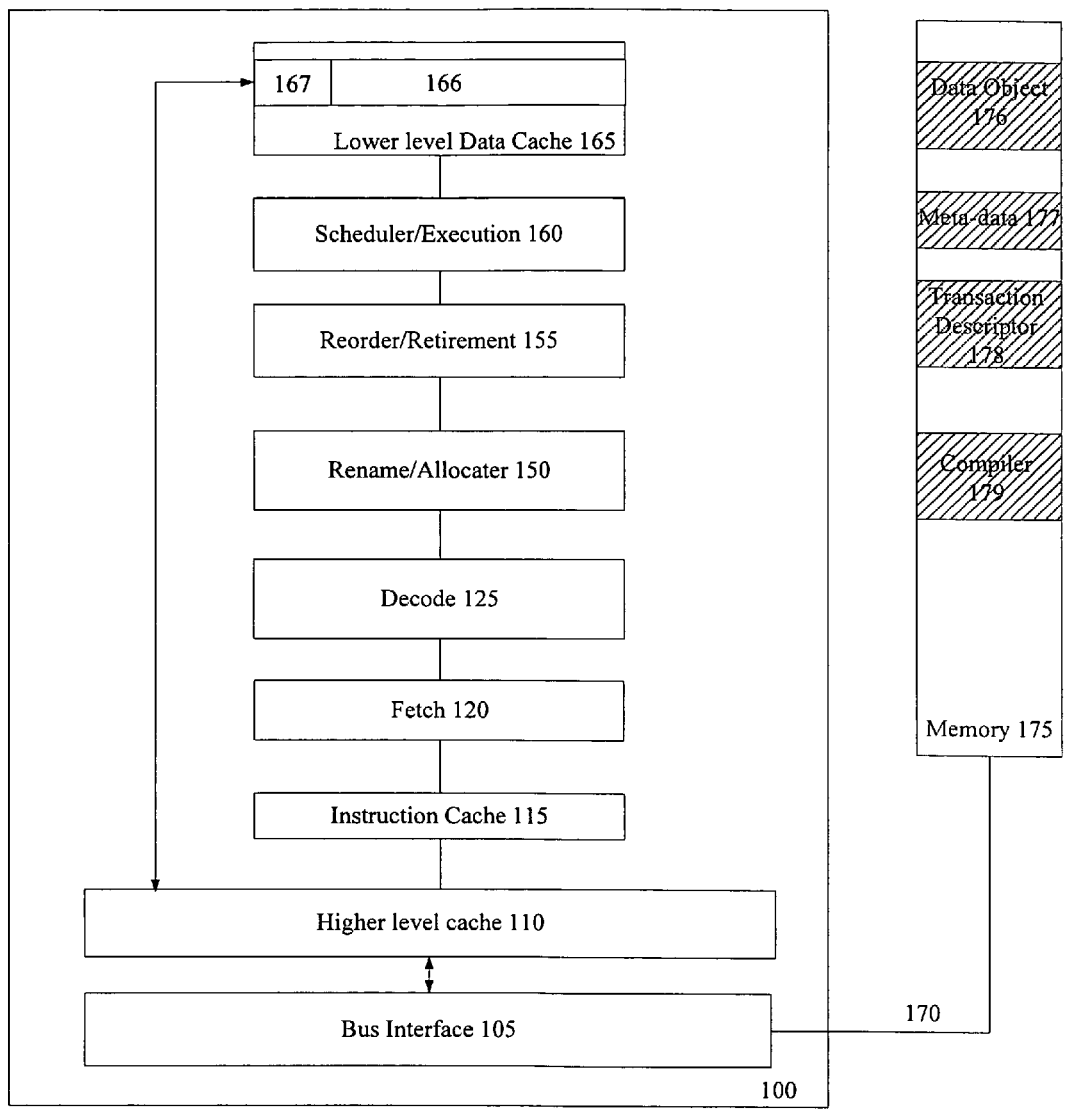
FIG. 1 illustrates an embodiment of a system capable of transactional execution.

Referring to FIG. 1, an embodiment of a processor capable of handling local dead data in a software transactional memory (STM) system is illustrated. In one embodiment, processor 100 is a multi-core processor capable of executing multiple threads in parallel. However processor 100 may include any processing element, such as an embedded processor, cell-processor, microprocessor, or other known processor, which is capable of executing one thread or multiple threads. As an illustrative example, a simplified embodiment of an out-of-order architecture for a processor is illustrated in FIG. 1.

The modules shown in processor 100, which are discussed in more detail below, are potentially implemented in hardware, software, firmware, or a combination thereof. Note that the illustrated modules are logical blocks, which may physically overlap the boundaries of other modules, and may be configured or interconnected in any manner. In addition, the modules as shown in FIG. 1 are not required in processor 100. Furthermore, other modules, units, and known processor features may also be included in processor 100.

Bus interface module 105 is to communicate with a device, such as system memory 175, a chipset, a north bridge, or other integrated circuit. Typically bus interface module 105 includes input/output (I/O) buffers to transmit and receive bus signals on interconnect 170. Examples of interconnect 170 include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol.

Processor 100 is coupled to memory 175, which may be dedicated to processor 100 or shared with other devices in a system. Examples of memory 175 includes dynamic random access memory (DRAM), static RAM (SRAM), non-volatile memory (NV memory), and long-term storage. Bus interface unit 105 as shown is also to communicate with higher level cache 110.

Higher-level cache 110 is to cache recently fetched and/or operated on elements. In one embodiment, higher-level cache 110 is a second-level data cache. However, higher level cache 110 is not so limited, as it may be or include instruction cache 115 to store recently fetched/decoded instructions. Instruction cache 115, which may also be referred to as a trace cache, is illustrated before fetch logic 120 and decode logic 125. Here, instruction cache 115 stores recently fetched instructions that have not been decoded. Yet, instruction cache 115 is potentially placed after fetch logic 120 and/or after decode logic 125 to store decoded instructions.

Fetch logic 120 is to fetch data/instructions to be operated on/executed. Although not shown, in one embodiment, fetch logic includes or is associated with branch prediction logic, a branch target buffer, and/or a prefetcher to predict branches to be executed/taken and pre-fetch instructions along a predicted branch for execution. Here, a processor capable of speculative execution potentially prefetches and speculatively executes predicted branches. Decode logic 125 is coupled to fetch logic 120 to decode fetched elements.

Allocator and renamer module 150 includes an allocator to reserve resources, such as register files to store instruction processing results and a reorder buffer to track instructions. Unit 130 may also include a register renamer to rename program/instruction reference registers to other registers internal to processor 100. Reorder/retirement module 125 includes components, such as the reorder buffers mentioned above, to support out-of-order execution and later retirement of instructions executed out-of-order. In one embodiment, where processor 100 is an in-order execution processor, reorder/retirement module 155 may not be included.

Scheduler and execution module 120, in one embodiment, includes a scheduler unit to schedule instructions/operations on execution units. Register files associated with execution units are also included to store information instruction processing results. Exemplary execution units include a floating point execution unit, an integer execution unit, a jump execution unit, a load execution unit, a store execution unit, and other known execution units.

Also shown in FIG. 1 is lower level data cache 165. Data cache 165 is to store recently used/operated on elements, such as data operands. In one embodiment, a data translation lookaside buffer (DTLB) is associated with lower level data cache 165. Often a processor logically views physical memory as a virtual memory space. As a specific example, a processor may include a page table structure to break physical memory into a plurality of virtual pages. Here, a DTLB supports translation of virtual to linear/physical addresses. Data cache 165 may be utilized as a transactional memory or other memory to track tentative accessed during execution of a transaction, as discussed in more detail below.

In one embodiment, processor 100 is a multi-core processor. A core often refers to any logic located on an integrated circuit capable of maintaining an independent architectural state, wherein each independently maintained architectural state is associated with at least some dedicated execution resources. In one embodiment, execution resources, such as execution module 160, include physically separate execution units dedicated to each core. However, execution module 160 may include execution units that are physically arranged as part of the same unit or in close proximity; yet, portions of execution module 160 are logically dedicated to each core. Furthermore, each core may share access to processor resources, such as higher level cache 110.

In another embodiment, processor 100 includes a plurality of hardware threads. A hardware thread typically refers to any logic located on an integrated circuit capable of maintaining an independent architectural state, wherein the independently maintained architectural states share access to some execution resources. For example, smaller resources, such as instruction pointers, renaming logic in rename allocater logic 150, an instruction translation buffer (ILTB) may be replicated for each hardware thread, while, resources, such as re-order buffers in reorder/retirement unit 155, load/store buffers, and queues may be shared by hardware threads through partitioning. Other resources, such as low-level data-cache and data-TLB 165, execution unit(s) 160, and parts of out-of-order unit 155 are potentially fully shared.

As can be seen, as certain processing resources are shared and others are dedicated to an architectural state, the line between the nomenclature of a hardware thread and core overlaps. Yet often, a core and a hardware thread are viewed by an operating system as individual logical processors, with each logical processor being capable of executing a thread. Logical processors may also be referred to herein as resources or processing resources. Therefore, a processor, such as processor 100, is capable of executing multiple threads on multiple logical processors/resources. Consequently, multiple transactions may be simultaneously and/or concurrently executed in processor 100.

A transaction includes a grouping of instructions, operations, or micro-operations, which may be grouped by hardware, software, firmware, or a combination thereof. For example, instructions may be used to demarcate a transaction. Typically, during execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible. However, if the transaction is invalidated during its pendancy, the transaction is restarted without making the updates globally visible. As a result, pendancy of a transaction, as used herein, refers to a transaction that has begun execution and has not been committed or aborted, i.e. pending. Two example systems for transactional execution include a Hardware Transactional Memory (HTM) system and a Software Transactional Memory (STM) system.

A Hardware Transactional Memory (HTM) system often refers to tracking access during execution of a transaction with processor 100 in hardware. For example, a cache line 166 is to cache data item/object 176 in system memory 175. During execution of a transaction, annotation/attribute field 167, which is associated with cache line 166 is utilized to track accesses to and from line 166. For example, attribute field 167 includes a transaction read bit to track if cache line 166 has been read during execution of a transaction and a transaction write bit to track if cache line 166 has been written to during execution of the transaction.

Attribute field 167 is potentially used to track accesses and detect conflicts during execution of a transaction, as well as upon attempting to commit the transaction. For example, if a transaction read bit in field 167 is set to indicate a read from line 166 occurred during execution of a transaction and a store associated with line 166 from another transaction occurs, a conflict is detected. Examples of utilizing an attribute field for transactional execution is included in co-pending application with Ser. No. 11/027,623 entitled, "Transaction based shared data operations in a Multiprocessor Environment."

A Software Transactional Memory (STM) system often refers to performing access tracking, conflict resolution, or other transactional memory tasks in software. As a general example, compiler 179 in system memory 175, when executed by processor 100, compiles program code to insert read and write barriers into load and store operations, accordingly, which are part of transactions within the program code. Compiler 179 may also insert other transaction related operations, such as commit or abort operations.

As shown, cache 165 is still to cache data object 176, as well as meta-data 177 and transaction descriptor 178. However, meta-data location 177 is associated with data item 176 to indicate if data item 176 is locked. A read log, which may be present in transaction descriptor 178, is used to log read operations, while a write buffer or other transactional memory, which may include lower-level data cache 165, is used to buffer or log write operations. Inserted calls for validation and commit utilize the logs to detect conflicts and validate transaction operations.

Figure 2:
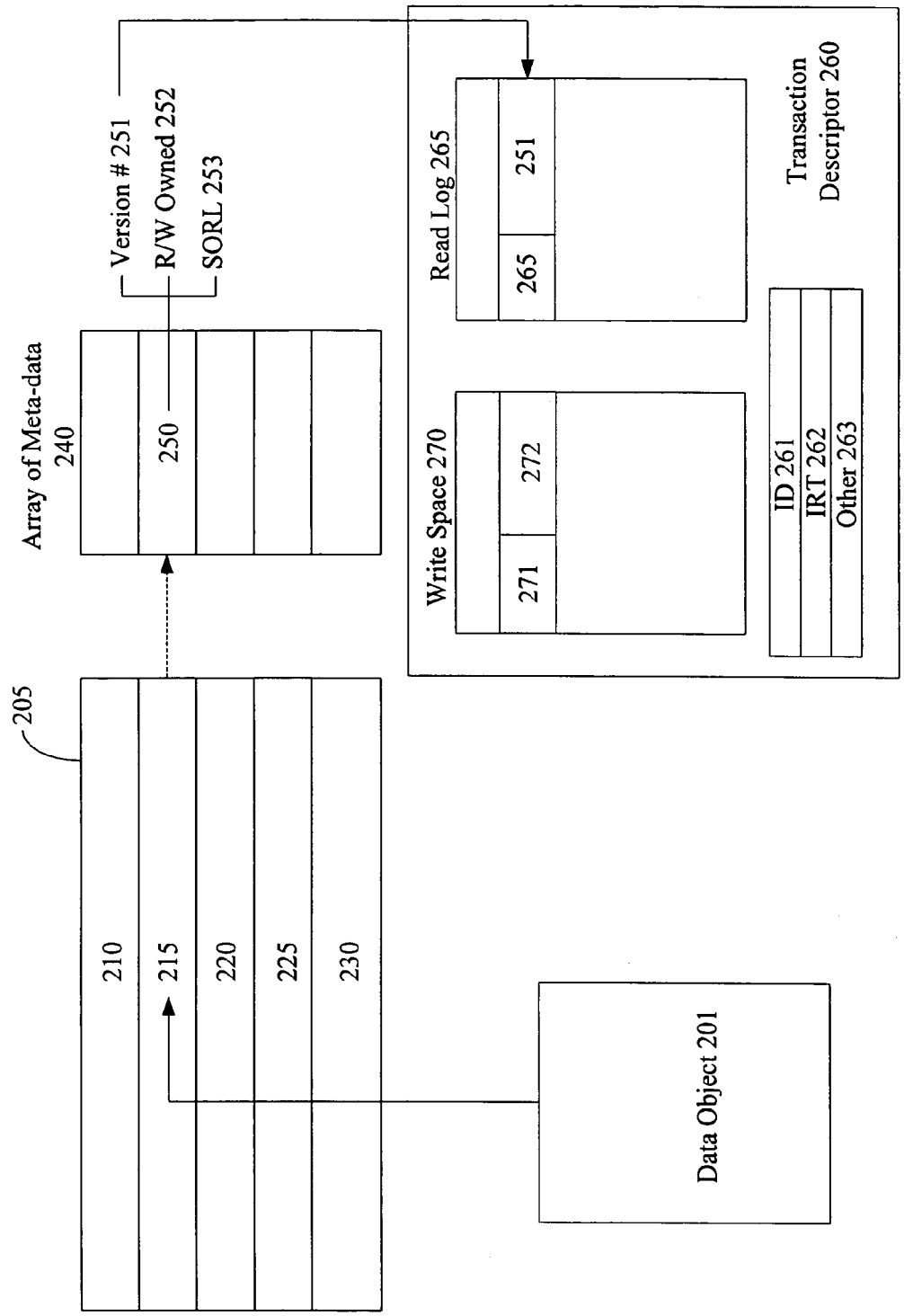
FIG. 2 illustrates an embodiment of a Software Transactional Memory (STM) system.

Referring to FIG. 2, an embodiment of a Software Transactional Memory (STM) system is illustrated. Data object 201 includes any granularity of data, such as a bit, a word, a line of memory, a cache line, a table, a hash table, or any other known data structure or object. For example, a programming language defined data object is data object 201. Transactional memory 205 includes any memory to store elements associated with transactions. Here, transactional memory 205 comprises plurality of lines 210, 215, 220, 225, and 230. In one embodiment, memory 205 is a cache memory. As an example, data object 201 is to be stored aligned in cache line 215. Alternatively, data object 201 is capable of being stored unaligned in memory 205.

In one example, each data object is associated with a meta-data location in array of meta-data 240. As an illustrative embodiment, an address associated with cache line 215 is hashed to index array 240, which associates meta-data location 250 with cache line 215 and data object 201. Note that data object 201 may be the same size of, smaller than (multiple elements per line of cache), or larger than (one element per multiple lines of cache) cache line 215. In addition, meta-data location 250 may be associated with data object 201 and/or cache line 215 in any manner.

Usually, meta-data location 250 represents whether data object 201 is locked or available. In one embodiment, when data object 201 is locked, meta-data location 250 includes a first value to represent a locked state, such as read/write owned state 252. Another exemplary lock state is a Single Owner Read Lock (SORL) state, which is discussed in more detail in co-pending related application entitled, "A mechanism for Irrevocable Transactions," with a Ser. No. 11/648,485. Yet, any lock or lock state may be utilized and represented in meta-data location 250. When unlocked, or available, meta-data location 250 includes a second value. In one embodiment, the second value is to represent version number 251. Here, version number 251 is updated, such as incremented, upon a write to data object 201, to track a current version of data object 201.

As an example to illustrate operation of the embodiment shown in FIG. 2, in response to a first read operation in a transaction referencing data object 201/cache line 215, the read is logged in read log 265. In one embodiment read log 265 is included in transaction descriptor 260. Transaction descriptor may also include write space 270, as well as other information associated with a transaction, such as transaction identifier (ID) 261, irrevocable transaction (IRT) indicator 262, and other transaction information. However, write space 270 and read log 265 are not required to be included in transaction descriptor 260. For example, write space 270 may be separately included in a different memory space from read log 265 and/or transaction descriptor 260. Irrevocable transactions and transaction descriptors are discussed in more detail in co-pending related application entitled, "A mechanism for Irrevocable Transactions," with a Ser. No. 11/648,485.

In one embodiment, logging a read includes storing version number 251 and an address associated with data object 201 or cache 215 in read log 265. Here, assume version number 251 is one to simplify the example. Upon encountering a write referencing an address associated with data object 201, the write is potentially logged or tracked as a tentative update. In addition, the meta-data location is updated to a lock value, such as two, to represent data object 201 is locked by the transaction or resource executing the transaction. In one embodiment, the lock value is updated utilizing an atomic operation, such as a read, modify, and write (RMW) instruction. Examples of RMW instructions include Bit-test and Set, Compare and Swap, and Add.

The write includes an update for data-object 201, which may be buffered in write space 270 or tentatively updated in cache line 215 with the old value for data object 201 logged in write space 270. Write/store operations including logging of old values or buffering of new values will be discussed in more detail below in reference to FIGS. 3 and 4. When the transaction is committed, the lock for data object 201 acquired for the write in meta-data location 250 is released. In one embodiment, releasing lock 250 includes returning meta-data location 250 to a value of one to represent an unlocked state. Alternatively, the value is incremented to represent unlocked version value 251 of three. This versioning allows for other transactions to validate their reads that loaded data object 201 by comparing the other transactions logged version values in their read logs to current version value 251.

The example above includes one embodiment of implementing an STM; however, any known implementation of an STM may be used. STMs are discussed in the following articles: "Implementing a High Performance Software Transactional Memory for a Multi-core Runtime" by Bratin Saha, Ali-Reza Adl-Tabatabai, Rick Hudson, Chi Cao Minh, and Ben Hertzberg, *Proceedings of the eleventh ACM SIGPLAN symposium on Principles and practice of parallel programming*; "Software Transactional Memory" by N. Shavit and D. Tuitou, *Proceedings of the Fourteenth ACM SIGACT-SIGOPS Symposium on Principles of Distributed Computing*; "Language Support for Lightweight Transactions", by T. L. Harris and K. Fraser, *Proceedings of the* 2003 *ACM SIGPLAN Conference on Object-Oriented Programming Systems*, Languages and Applications; and "Compiler and runtime support for efficient software transactional memory," by Ali-Reza Adl-Tabatabai, Brian Lewis, Vijay Menon, Brian Murphy, Bratin Saha, and Tatiana Shpeisman. *Proceedings of the* 2006 *ACM SIGPLAN conference on Programming language design and implementation.*"

In fact, any known system for performing transactional memory may also be used, such as an HTM, an STM, an Unbounded Transactional Memory (UTM) system, a hybrid Transactional Memory system, such as a hardware accelerated STM (HASTM), or any other transactional memory system. Co-pending and related application entitled, "Hardware Acceleration of a write-buffering software transactional memory," with Ser. No. 11/784,850 discusses hardware acceleration of an STM. Co-pending application entitled, "Overflow Method for Virtualized Transactional Memory," with Ser. No. 11/479,902 discusses extending/virtualizing an HTM.

As stated above, write space 270 may be utilized as a write buffer to buffer tentative updates during a transaction or a write-log to log old values associated with tentative updates during a transaction. In one embodiment, utilizing write space 270 as a buffer is often referred to as a write-back STM. Here, a new value or tentative update is buffered in write buffer 270. In response to a commit of the transaction, the new values are "written-back" to their corresponding locations, while in response to an abort of the transaction the new values in write buffer 270 are discarded. Any storage element, such as registers, memory, or other buffer may be used for write buffer 270.

The use of write space 270 as a log is often referred to as a roll-back STM. Here, a write updates cache line 215 with a new value, and an old value 272 is stored in write log 270. Upon committing the transaction, the old values in write log 270 are discarded, and conversely, upon aborting the transaction, the old values in write log 270 are restored to cache 205, i.e. the locations are "rolled-back" to their original values before the transaction. Examples of write space 270 include a write log, a group of check pointing registers, and a storage space to log/checkpoint values to be updated during a transaction. More information on efficient checkpointing and roll-back for transactions is discussed in co-pending related application entitled, "Compiler Technique for Efficient Register Checkpointing to Support Transaction Roll-back," with Ser. No. 11/648,486.

Figure 3:
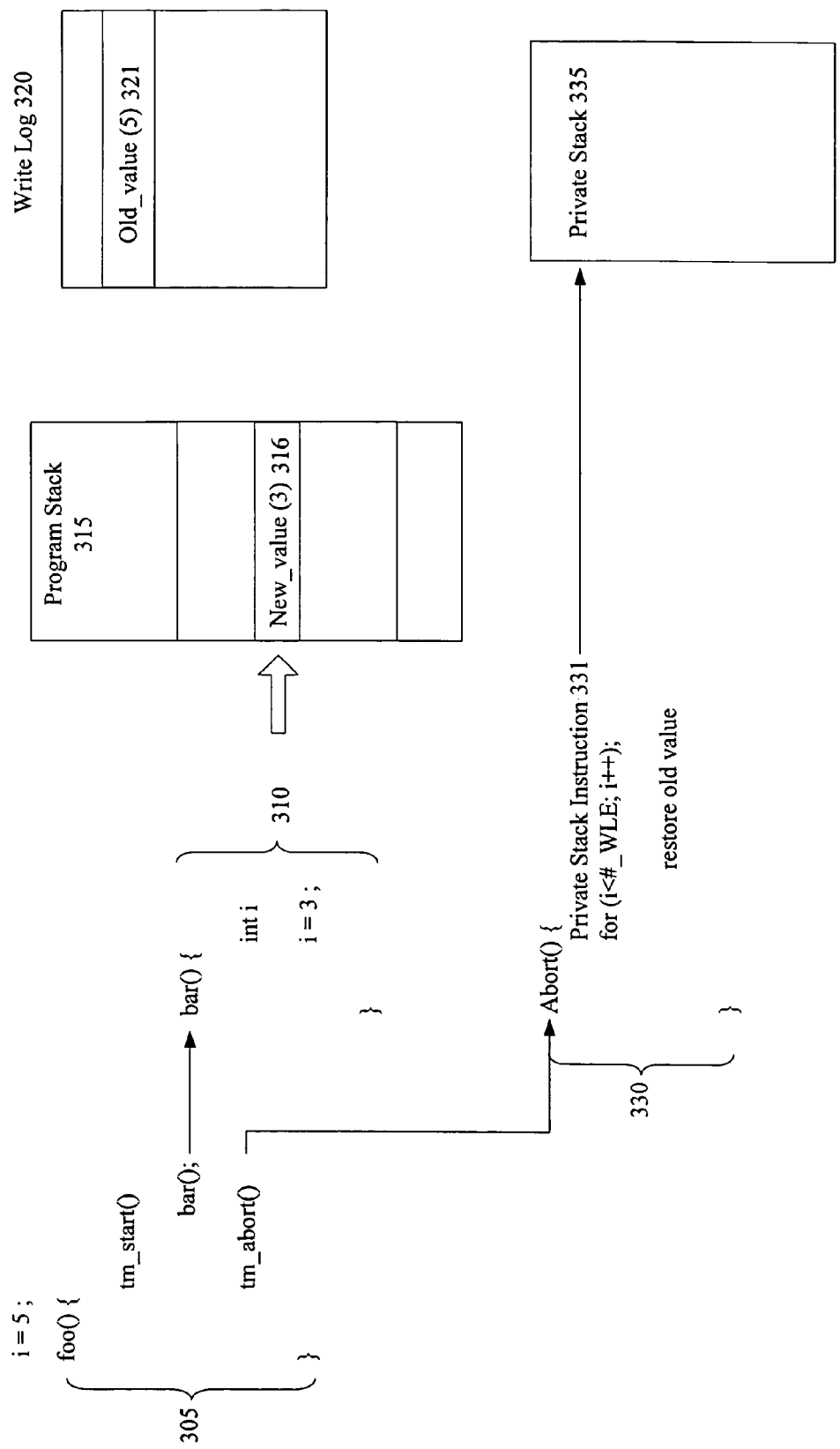
FIG. 3 illustrates an embodiment of a roll-back STM capable of preventing local dead data from corrupting an abort function of a transaction.

Turning to FIG. 3, an embodiment of a write-logging, i.e. roll-back, STM to associate an abort function with a private stack is illustrated. Here, a start transaction instruction tm_start( ) demarcates the beginning of a transaction in function foo 305. Within the transaction function bar 310 is called.

Here, a local variable i is declared and a store of the value 3 to i is encountered. In addition, function bar may have other operations that share I with other threads and therefore the variable i is to be logged.

An old value of location i, such as the value 5, is logged in entry 321 in write log 320, while the new value of 3 modifies location 316 allocated for i in program stack 315. When function bar 310 returns, local variable i becomes a dead element. Previously, in response to encountering an abort event, such as an invalid read set, abort function 330, would roll-back program stack utilizing write log 320. Essentially, for each write log entry, such as write log entry 321, an old value of 5, is written back to entry location 316. However, as the variable i is dead data, when it is written back to program stack 315, if abort function 330 is utilizing program stack 315 the write back of old value 5 may corrupt function 330's local data element i.

Instead in abort function 330 new stack or switch to new stack instruction 331 is inserted, when executed, to associate abort function 330 with private stack 335. As a result, local data element i for function 330 is stored in private stack 335. Here, local dead data of bar function 310 is prevented from overwriting local data of abort function 330, as local variables for abort function 330 is stored in a separate stack. Essentially, the roll-back of location 316 from the new value of 3 to the old value of 5 from log entry 321 does not affect the location stored in private stack 335 where abort function 330's local variables are to be stored.

Figure 4:
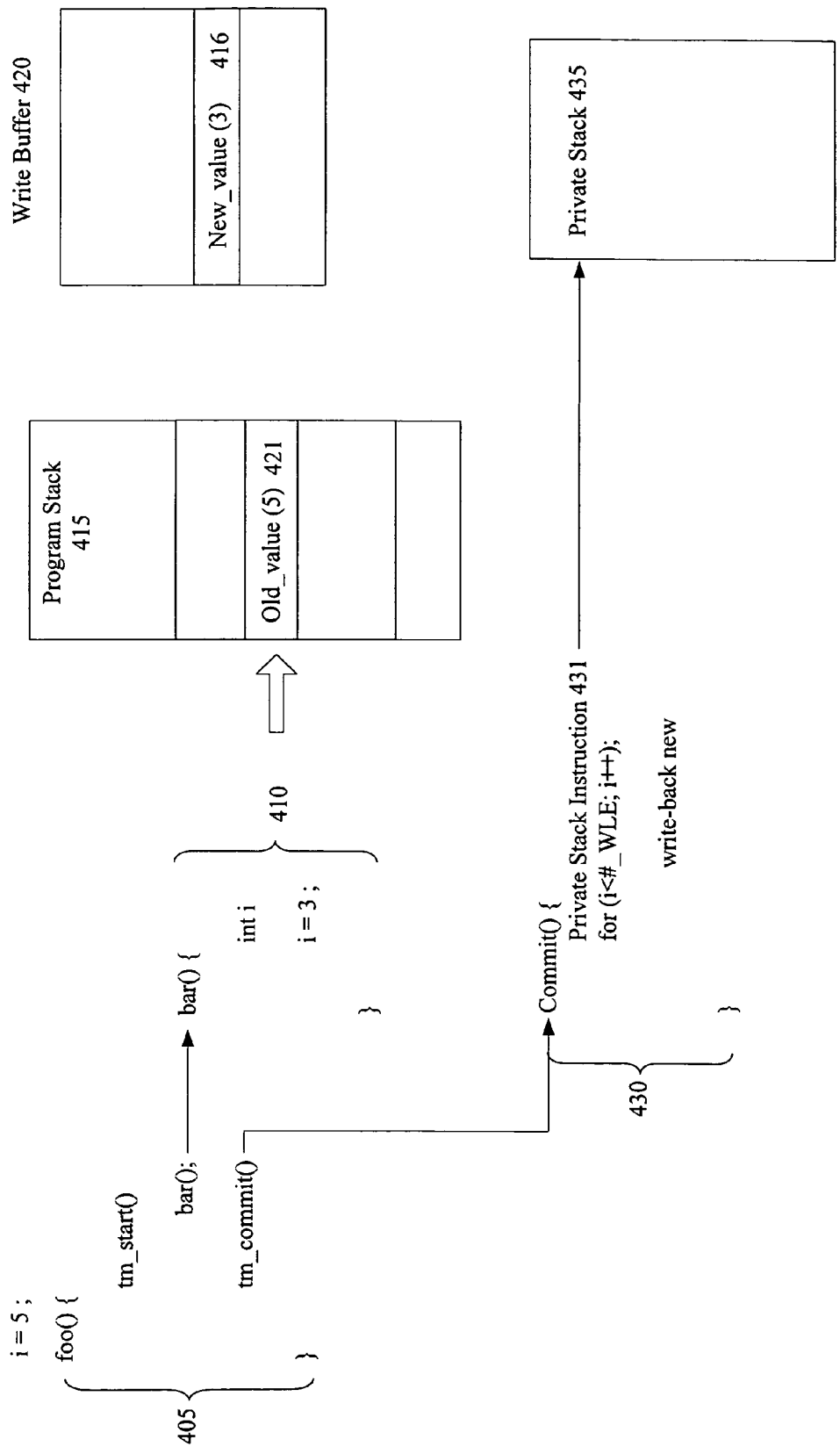
FIG. 4 illustrates an embodiment of a write-back STM capable of preventing local dead data from corrupting commit function of a transaction.

Turning to FIG. 4 an embodiment of a write-buffering, i.e. write-back, STM to associate a commit function with a private stack is illustrated. Here, a start transaction instruction tm_start( ) demarcates the beginning of a transaction in function foo 405. Within the transaction function bar 410 is called. Here, a local variable i is declared and a store of the value 3 to i is encountered.

A new value of location i, such as the value 3, is buffered in entry 421 in write buffer 420, while the old value of 3 remain in original location 416 allocated for i in program stack 415. When function bar 410 returns, local variable i becomes a dead element. In response to an abort, the new values in write buffer 420 are discarded. However, in commit function 430, new values, such as value 3 in entry 416, are written-back to program stack 415 to modify location 421. Similar to the embodiment shown in FIG. 3, switch stack instruction 431 associates commit function 430 with private stack 435 to prevent local dead elements of function 410 from overwriting local elements of commit function 430.

Figure 5:
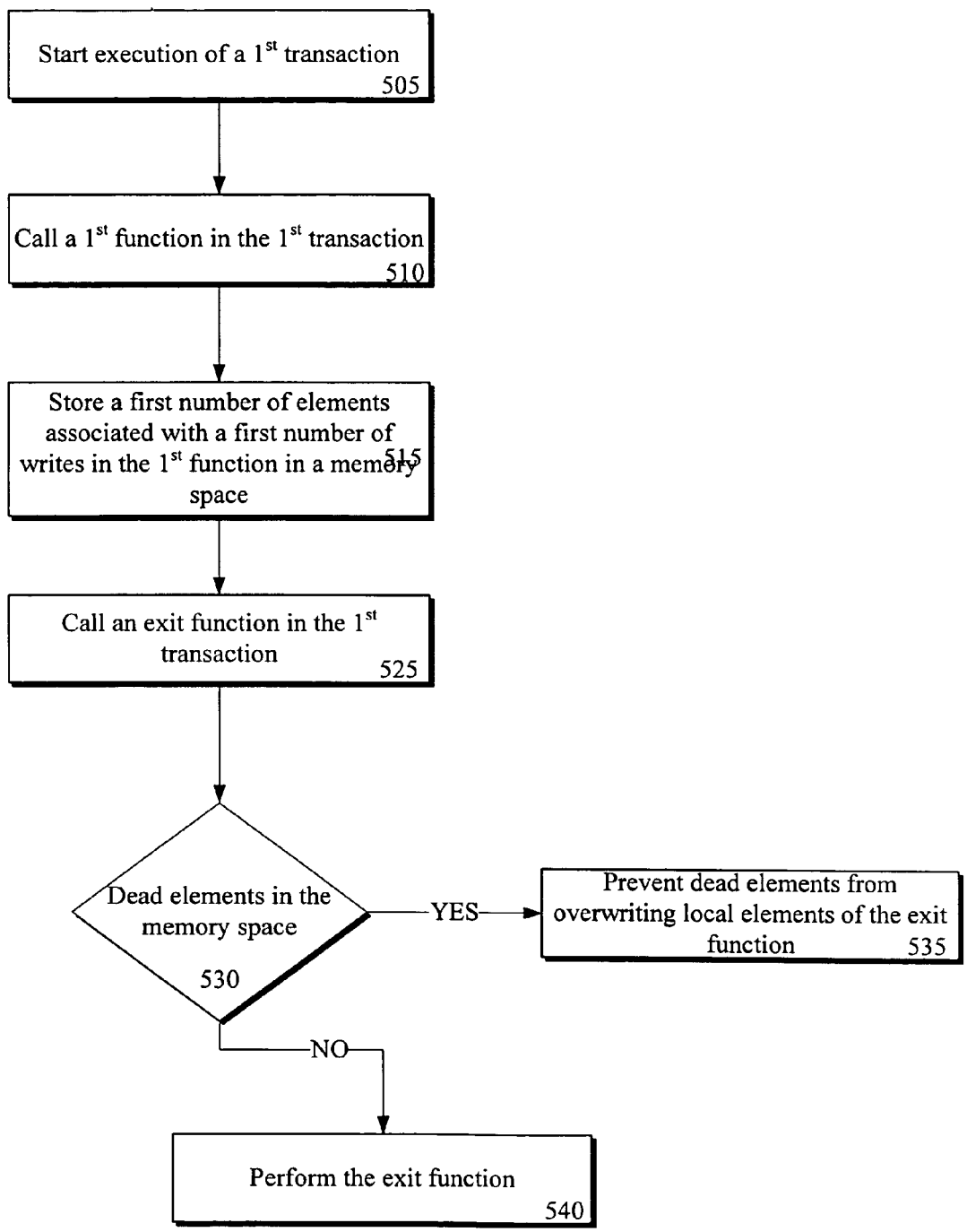
FIG. 5 illustrates an embodiment of a flow diagram for a method of detecting and preventing dead elements from overwriting local elements of a transaction exit function.

Turning to FIG. 5 an embodiment of a flow diagram for a method of detecting and preventing dead elements from overwriting local elements of a transaction exit function is illustrated. In flow 505, execution of a first transaction is started. Often, a start transaction instruction is executed to demarcate the beginning of a transaction. Next, in flow 510, a first call in the first transaction to a first function is executed. For example, a call to user-defined function or library is made.

In flow 515, a first number of elements associated with a first number of writes in the first function is stored in a memory space. In one embodiment, the memory space is a write buffer. Here, storing the first number of elements in a write space includes storing the first number of elements in the write buffer. In this case, an exit function to prevent corruption of data includes a commit function to write-back the first number of elements in the write buffer to a program stack.

In another embodiment, the memory space is a write log. Storing a first number of elements in a memory space includes storing a first number of original elements/values modified by the first number of writes are stored to the write log. Here, an exit function to prevent data corruption includes an abort function to roll-back a program stack to the first number of elements held in the write log.

In flow 525 a call in the first transaction to an exit function is included. As above, if a write-buffering STM stored the first number of elements in the memory space, i.e. the write buffer, to be written-back to a program stack in response to a commit event, i.e. an instruction to call a commit function, then in flow 525 a commit function is called. However, if a roll-back STM stored old values in the memory space, i.e. a write-log, to roll-back locations in a program stack in response to an abort event, such as an invalid read set, then in flow 525 an abort function is called.

In flow 530 a plurality of dead elements of the first number of elements is determined. In one embodiment, each local element of the first number of elements is determined to be a dead element in response to returning from the first function.

In another embodiment, each element of the first number of elements that reference a location above a first pointer to a first location in a program stack is a dead element. In addition, each element of the first number of elements that references a location below a second pointer to a second location in the program stack is a dead element. As an example, the first pointer includes a stack pointer after a commit/abort, and the second pointer includes a current stack pointer. Essentially, any element to be rolled-back that references a location in the program stack above or below an active window in the program stack is considered a dead element If no dead elements are detected/determined, then in flow 540 the exit function is performed as usual. However, if dead elements are detected, then in flow 535 dead elements are prevented from overwriting local elements associated with the exit function. In one embodiment, preventing the plurality of dead elements from overwriting a plurality of local elements associated with the exit function includes not rolling or writing back the plurality of dead elements from the memory space to a program stack. Here, the roll-back or write back of dead elements is simply omitted. In another embodiment, preventing the plurality of dead elements from overwriting a plurality of local elements associated with the exit function includes removing any elements associated with the first function determined to be dead elements from the write space and/or program stack upon returning from the first function. In other words, any dead local elements in the first function are "cleaned up," i.e. removed, in response to returning from the first function.

Figure 6:
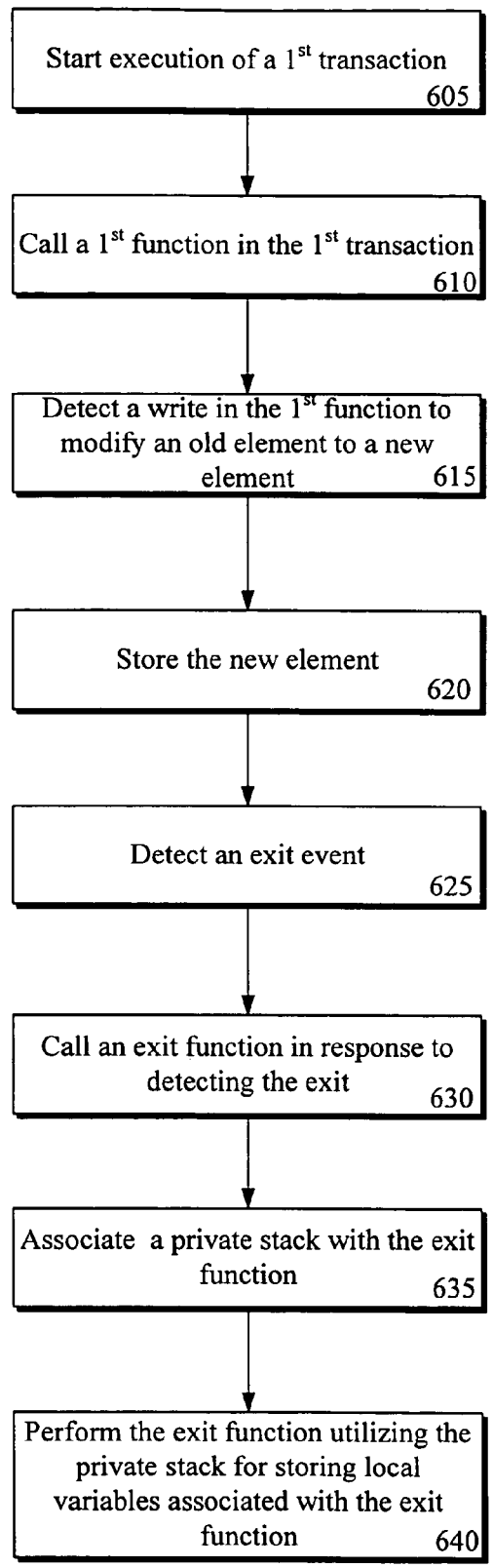
FIG. 6 illustrates an embodiment of a flow diagram for a method of associating a private stack with a transaction exit function.

FIG. 6 illustrates an embodiment of a flow diagram for a method of associating a private stack with a transaction exit function. In flow 605 execution of a 1$^{st}$ transaction is started. Similarly, a first function in the first transaction is called in flow 615. In flow 615 a write in the first function to modify an old element to a new element is detected. Elements include any grouping of information, such as a variable, a local variable, a storage element, a register, an abstract register, a virtual register, a data operand, a local data operand, an instruction, a line of memory, a cache line, and a stack location.

Next, in flow 620, the new element is stored. In one embodiment, the new element is stored in a program stack and the old value is logged in a write log. Here, address taken variables, such as local variables, are stored in the program stack, i.e. a first memory space. In another embodiment, new value is buffered in a write buffer and the old value remains in the program stack location. The new element is stored in a program stack and the old value is logged in a write log. Here, local variables are stored in the write buffer, i.e. a first memory space.

In flow 625 an exit event is detected. Examples of an exit event include a call to an abort function, a call to a commit function, an invalid read set, an invalidating access, a data conflict, or other event to abort or commit a transaction. In flow 630, a call to an exit function is made in response to detecting the exit event. In one embodiment, a jump to exit code is executed. In flow 635, either before the call to the exit function or within the exit function a private stack, i.e. a second memory space, is associated with the exit function. In one embodiment, a switch stack instruction or new stack instruction is executed to switch from the first memory space, such as the program stack, write-log, or write-buffer, to a second memory space, such as a private stack for the exit function.

Finally, in flow 640 the exit function is performed utilizing the private stack for local variables associated with the exit function. Here, a plurality of local elements for the exit function are stored in the private stack rather than the first memory space, i.e. the program stack.

Figure 7:
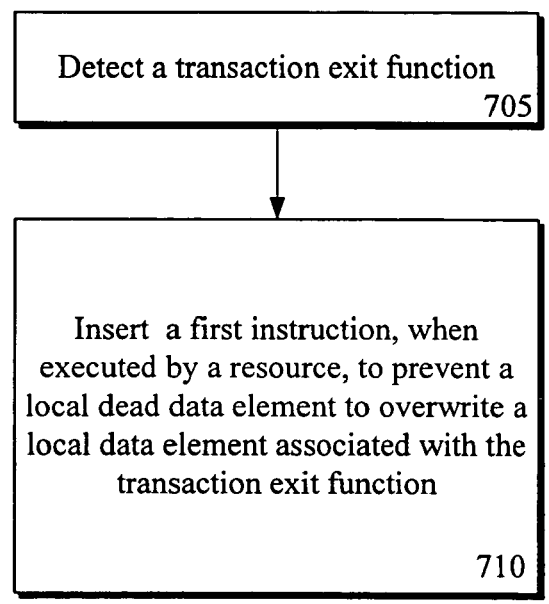
FIG. 7 illustrates an embodiment of a flow diagram for a method of inserting an instruction to prevent local dead data elements from corrupting local elements of a transaction exit function.

Referring to FIG. 7, an embodiment of a flow diagram for a method of inserting an instruction to prevent local dead data elements from corrupting local elements of a transaction exit function. In flow 705, a transaction exit function in a first transaction is detected in flow 705. In one embodiment, an exit function is a commit function to write-back a plurality of data elements buffered in a write-buffer. Here, a local dead data element is potentially one of the plurality of data elements buffered in the write-buffer. Therefore, the potential local dead data element is to be prevented from overwriting local elements associated with the commit function.

In another embodiment, the exit function is an abort function to roll-back to a plurality of data elements logged in a write-log. Here, a local dead data element is potentially stored in the write-log. As a result, the potential local dead data element is to be prevented from overwriting local elements associated with the abort function. As an example, the transaction exit function is to be called in the first transaction in response to an exit event, such an unsuccessful validation of a read set associated with the first transaction, a potential abort point of the first transaction, or a commit point of the first transaction.

Next, in flow 710 a first instruction is inserted that, when executed by a resource, is to prevent a local dead data element from overwriting a local data element associated with the transaction exit function. In one embodiment, the first instruction includes a new stack instruction or a switch memory space instruction, when executed, to associate the transaction exit function with a new private stack. Here, the transaction exit function, when associated with the new private stack, is to store the local data element in the new private stack to prevent the first local data element from being overwritten by the local dead data element. Essentially, the exit function, when executed, is to store its local variables in the private stack in response to the switch memory space instruction.

In another embodiment, the first instruction includes a remove dead data instruction, when executed, to remove the second local dead data element before executing the transaction exit function to prevent the local data element from being overwritten by the local dead data element. In yet another embodiment, the first instruction includes a detect dead data instruction, when executed, to detect the local dead data element to prevent the local data element from being overwritten by the local dead data element. Here, after detecting the local dead data element, the local dead data element is prevented from being copied from a write buffer or write log back to a program stack.

As illustrated above, corruption of a transaction exit function, such as an abort function for a roll-back STM and a commit function for a write-buffering STM, is prevented. In one embodiment, exit functions are associated with private stack to ensure exit function local variables are not overwritten by dead data. In another embodiment, upon returning from a function in a transaction any local elements associated with the function are removed to prevent them from corrupting the transaction exit function. In yet another embodiment, local dead data elements are detected in a write-log or write-buffer and are omitted from being stored in a program stack.

The embodiments of methods, software, firmware or code set forth above may be implemented via instructions or code stored on a machine-accessible or machine readable medium which are executable by a processing element. A tangible machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; or other device for storing or transmitting electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
    storing a first plurality of new transactional data elements accessed in response to execution of a first transaction in a first memory space associated with the first transaction;
    executing a call in the first transaction to an exit function;
    associating the exit function with a second memory space, which is private from the first memory space, in response to executing a call in the first transaction to the exit function; and
    storing a second plurality of new exit function data elements accessed in response to execution of the exit function in the second memory space and associating the exit function with the second memory space.

2. The method of claim 1, wherein the first memory space includes an application stack, and wherein the second memory space includes a private stack.

3. The method of claim 1, further comprising detecting an exit event, wherein executing the call in the first transaction to the exit function is in response to detecting the exit event, and wherein the exit event includes unsuccessful validation of a read operation in the first transaction.

4. The method of claim 3, wherein the first plurality of new transactional data elements include a first plurality of data operands, the second plurality of new exit function data elements include a plurality of exit function local data operands, and the exit function includes an abort function.

5. The method of claim 3, wherein the first plurality of new transactional data elements include a first plurality of data operands, the second plurality of new exit function data elements include a plurality of exit function local data operands, and the exit function includes a commit function.

6. A method comprising:
    executing a call in a first transaction to a first function;
    storing a value for a local variable within the first function in a memory space;
    executing a call in the first transaction to an exit function;
    determining, upon a return of the first function, the local variable is a dead element; and
    preventing the dead element from overwriting a local variable value associated with the exit function.

7. The method of claim 6, wherein the memory space is a write buffer.

8. The method of claim 7, wherein the exit function includes a commit function, and wherein live write values held in the write buffer are to be write-back from the write-buffer to a cache memory during execution of the commit function.

9. The method of claim 6, wherein the memory space is a write log.

10. The method of claim 9, wherein the exit function includes an abort function, and wherein write values held in the write-log are written to a cache memory to perform a roll-back to the write values.

11. The method of claim 6, wherein determining, upon a return of the first function, the local variable is a dead element; comprises determining each local variable, including the local variable, is a dead element in response to returning from the first function, and wherein preventing the dead element from overwriting a local variable value associated with the exit function comprises removing each dead element from the memory space in response to returning from the first function.

12. The method of claim 6, wherein determining, upon a return of the first function, the local variable is a dead element comprises
    determining each variable referencing a location above a first pointer to a first location in the memory space is a dead element in response to aborting the first transaction, wherein the local variable references a location above the first pointer; and
    determining each element of the first number of elements referencing a location below a second pointer to a second location in the memory space is a dead element in response to committing the first transaction wherein the local variable references a location below the first pointer; and
    wherein preventing the dead element from overwriting a local variable value associated with the exit function comprises not rolling back the plurality of dead elements from the memory space to a program stack.

13. A tangible machine readable medium including program code which, when executed by a machine, causes the machine to perform the operations of:
encountering a reference to a transaction exit function in a first transaction;
inserting a first instruction, when executed, to prevent a local dead data element written by an operation in the transaction from overwriting a local data element accessed by the transaction exit function.

14. The machine readable medium of claim 13, wherein the transaction exit function is a commit function to write-back a plurality of data elements buffered in a write-buffer, the local dead data element to be stored in the write-buffer.

15. The machine readable medium of claim 13, wherein exit function is an abort function to restore a plurality of locations to a plurality of corresponding data elements logged in a write-log, the local dead data element to be stored in the write-log.

16. The machine readable medium of claim 13, wherein the first instruction includes a new stack instruction, when executed, to associate the transaction exit function with a new private stack, the transaction exit function, when associated with the new private stack, to store the local data element in the new private stack to prevent the local dead data element from overwriting the local data element associated with the transaction exit function.

17. The machine readable medium of claim 13, wherein the first instruction includes a remove dead data instruction, when executed, to remove the local dead data element before executing the transaction exit function to prevent the local dead data element from overwriting the local data element associated with the transaction exit function.

18. The machine readable medium of claim 13, wherein the first instruction includes a detect dead data instruction, when executed, to detect the local dead data element to prevent the local dead data element from overwriting the local data element associated with the transaction exit function.

19. A system comprising:
a memory device to store compiler code and program code;
a processor coupled to the memory device to execute the compiler code, the compiler code, when executed to:
detect a transaction exit function in a first transaction within the program code;
insert a memory space instruction at the transaction exit function, the memory space instruction, when executed, to associate the exit function with a exit memory space that is private from a transactional memory space to be utilized by the first transaction.

20. The system of claim 19, wherein the transactional memory space includes a program stack, and wherein the exit memory space includes a private stack.

21. The system of claim 20, wherein the transaction exit function, when executed, is to store local variables for the transaction exit function in the private stack in response to executing the memory space instruction to associated the exit function with the private stack.

22. The system of claim 19, wherein the transaction exit function is to be called in a first transaction in response to an exit event, the exit event including unsuccessful validation of a read set associated with the first transaction, and wherein the transaction exit function is an abort transaction function.

23. The system of claim 19, wherein the transaction exit function is to be called in a first transaction in response to an exit event, the exit event including a call to a commit transaction function, and wherein the transaction exit function is the commit transaction function.

24. The system of claim 19, wherein the transactional memory space to be utilized by the first transaction includes a memory space selected from a group consisting of a program stack to hold new transactional values from the first transaction, a write-buffer to hold new transactional values from the first transaction, and a write-log to hold current non-transactional values replaced in a program stack by new transactional values from the first transaction.

* * * * *